Patented Nov. 26, 1935

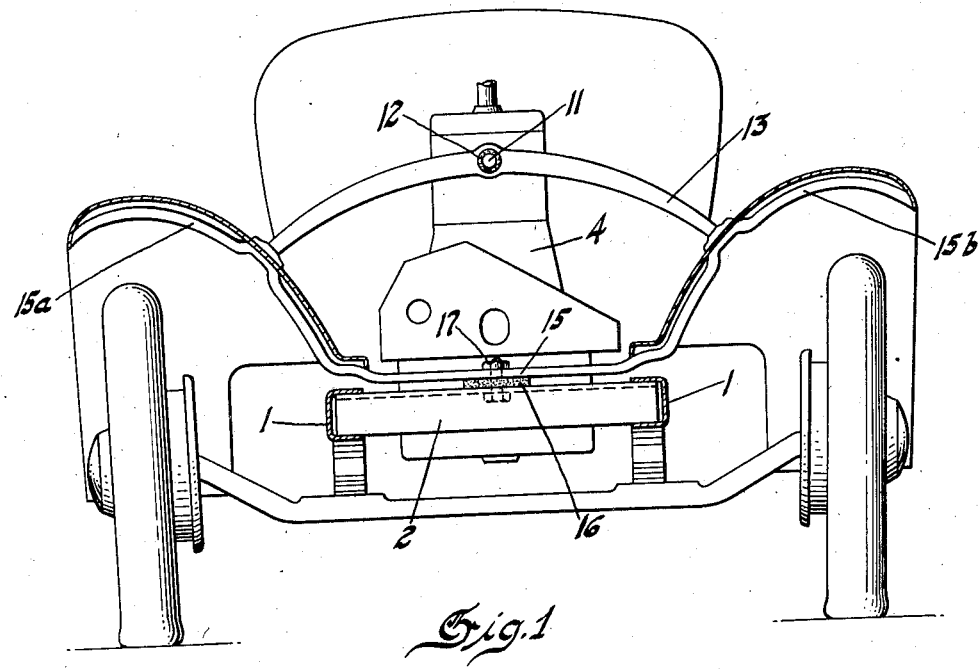
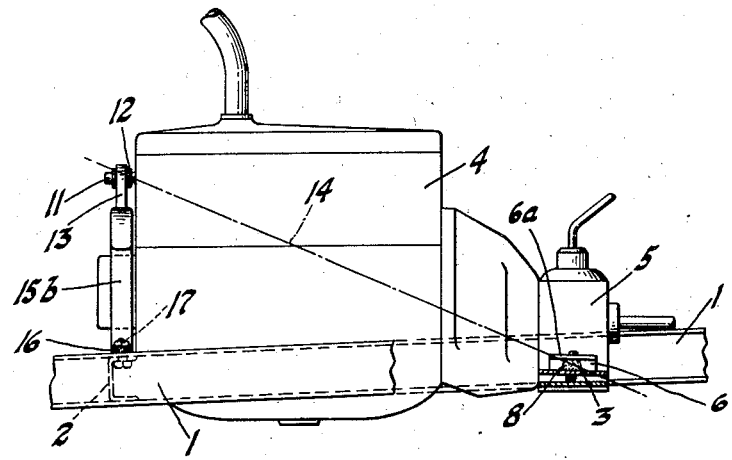
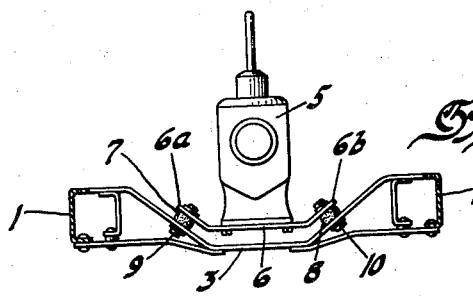

2,022,111

UNITED STATES PATENT OFFICE 2,022,111

ENGINE MOUNTING

Ronald K. Evans, Russelsheim-on-the-Main, Germany, assignor to General Motors Corporation, Detroit, Mich., a corporation of Delaware Application December 29, 1934, Serial No. 759,688
In Germany February 2, 1934

7 Claims. (Cl. 180—64)

It is known in automobiles to mount the engine in the frame of the car in such a way that it can oscillate around an axis passing through the center of gravity or nearly through the center of gravity, and which, starting from a high point of the front end of the engine housing, runs inclined backward. The inclination of the axis is generally determined in such a way that it intersects the driving shaft at about the middle of the transmission housing.

In the case of a three point suspension of the engine, the mounting itself is executed in such a way that the engine is supported on the front end by means of a pin fastened to the engine housing at a corresponding height, in a bearing support supported by the frame of the car, and at the rear end is supported by two supporting surfaces placed at the two sides of the center line of the engine at the elevation of the transmission housing. In this construction all the bearings must be made elastically flexible and the inclination of the rear supporting surfaces must be dimensioned in such a way that the verticals obtained therefrom intersect each other in the axis of the transmission housing.

The mounting of the engine described above has the advantage that it prevents the transmission of forces tending to twist the frame of the car. But it has a disadvantage in the fact that for the support of the pin mounted on the front end there must be provided a special bearing support which otherwise is not necessary, the space for the mounting of which is not easy to find and which requires special means for its mounting on the frame of the car. The fastening of the bearing support on the frame of the car offers the additional disadvantage that the torsional movements of the side members with relation to each other, due to the unevennesses of the highway, are transmitted to the engine housing.

According to the invention, for the purpose of saving a special bearing support on the front end of the engine, the fender support made in the form of a beam running through, is used also as a bearing support for the engine. For this purpose the outward curving arms of the fender support, at the height of the pin fastened to the engine housing, are connected by a suitably curved cross member, in which the pin of the engine is mounted.

In order still further to prevent the torsions of the side members, due to the unevennesses of the highway, being transmitted through the bearing support to the engine, the bearing support is mounted elastically in the middle of the front cross member of the frame. In that way, at the same time, the fender itself is protected from the torsions of the frame.

The drawing shows, as an example, one form of the invention, in which Figure 1 is a front view of the bearing support; Figure 2 is a side view of the bearing support and the engine housing; and Figure 3 is the construction of the rear supporting surfaces of the engine.

The frame of the car consists of U-shaped side members 1, a front cross member 2 and an intermediate cross member 3 which, as a result of the special form given to it forms the rear, oblique supporting surfaces for the support of the engine 4. The engine is supported at the rear at the elevation of the transmission housing 5. Below the transmision housing is a support 6 with arms 6a and 6b fastened on each side, which run parallel with the corresponding supporting surfaces of the cross member 3. By means of these arms the engine is mounted on the cross member 3 with the interposition of the rubber buffers 7 and 8, and held fast by bolts 9 and 10. For the support on the front end of the engine, a pin 11 is provided on the front of the engine housing, which is mounted in a cross member 13 with the interposition of a rubber ring 12. With this form of support the engine can oscillate around the axis 14, indicated in Figure 2, which runs approximately through the center of gravity.

The cross member 13 is connected with the outward curving arms 15a and 15b of the fender support 15, which goes entirely across in one piece. The curved cross member 13, together with the parts 15, 15a and 15b, thus forms a trapezoidal, box shaped support of great strength.

The support 15 is mounted on the front cross member 2 of the frame of the car. In order to prevent the torsions of the frame being transmitted to the support 15, this support is mounted elastically in the middle of the cross member, with the interposition of a rubber plate 16, by means of a bolt 17. If desired, it may carry also the engine cooling radiator.

I claim:

1. A combined power plant and fender mounting including in combination with a main frame supported upon road wheels, of a pair of vertically spaced bars extending transversely of the frame, the end portions of the lower bar extending upwardly for connection with the ends of the other bar and outwardly over the wheels for mounting wheel fenders, a pivotal mounting on the upper bar for the power plant and a connection between the main frame and the medial portion of the lower bar to accommodate relative tilting movement.

2. The combination with chassis frame, a power plant and a fender supporting structure, of a connection between the frame and fender supporting structure permitting relative tilting movement therebetween, and means mounting one end of the power plant on the chassis frame and the other end on the fender supporting structure in longitudinal alinement substantially with the center of mass of the power plant.

3. In a motor vehicle, a chassis frame, an engine, a beam extending entirely across the frame and terminating in outwardly curved arms for the support of fenders, means movably mounting said beam on the frame, a cross member connecting the outwardly curved arms of the fender supporting beam, and means for supporting the engine on said cross member.

4. The structure of claim 3, wherein the means movably mounting said beam on the frame includes an elastic coupling between the chassis frame and the middle of the fender supporting beam.

5. In a motor vehicle, a chassis frame, an engine positioned within the frame, a fender supporting bar extending across the frame forward of the engine and terminating in upwardly and outwardly directed arms, a hinged weight supporting connection between the middle of said bar and the frame, a fender brace bar connecting said arms and extending in vertically spaced relation above said hinged connection and supporting means for the front of said engine including a movable connection between the engine and said brace bar.

6. In combination, a chassis frame, an engine to be received within the frame, a fender supporting beam extending across the frame at the forward end of the engine and terminating beyond each side of the frame in upwardly and outwardly projecting fender supporting arms, means connecting the beam and the frame on the longitudinal center line of the vehicle and permitting relative oscillation thereabout of the frame and beam, and resilient means mounting the rear of the engine on the frame and the front of the engine on said beam to accommodate movement of the engine relative to both the frame and said beam.

7. In combination, a chassis frame, an engine to be received within the frame, a fender supporting beam extending across the frame at the forward end of the engine and terminating beyond each side of the frame in upwardly and outwardly projecting fender supporting arms, means connecting the beam and the frame on the longitudinal center line of the vehicle and permitting relative oscillation thereabout of the frame and beam, and means spaced vertically above the first mentioned means for movably connecting the engine near the top thereof to the fender supporting beam.

RONALD K. EVANS.